United States Patent
Bostrom et al.

(10) Patent No.: US 7,249,784 B2
(45) Date of Patent: Jul. 31, 2007

(54) SAFETY ARRANGEMENT

(75) Inventors: Ola Bostrom, Alingsas (SE); Yngve Haland, Falsterbo (SE); Alf Holgers, Alingsas (SE); Anders Gustafsson, Vargarda (SE)

(73) Assignee: Autoliv Development AB, Vargarda (SE)

( * ) Notice: Subject to any disclaimer, the term of this patent is extended or adjusted under 35 U.S.C. 154(b) by 254 days.

(21) Appl. No.: 11/147,646

(22) Filed: Jun. 8, 2005

(65) Prior Publication Data

US 2006/0001252 A1    Jan. 5, 2006

(30) Foreign Application Priority Data

Jun. 8, 2004    (GB)    ................. 0412830.2

(51) Int. Cl.
*B60R 22/343*    (2006.01)
(52) U.S. Cl. .............. 280/806; 280/808; 280/735
(58) Field of Classification Search ......... 280/735, 280/808, 801.1, 806, 739, 752; 180/268; 297/468, 479, 480
See application file for complete search history.

(56) References Cited

U.S. PATENT DOCUMENTS 5,123,673 A    6/1992    Tame

FOREIGN PATENT DOCUMENTS

| EP | 1 038783 | | 3/2000 |
|---|---|---|---|
| EP | 1 356 998 | | 10/2003 |
| GB | 2070415 A | * | 9/1981 |
| GB | 2 395 465 | | 5/2004 |
| JP | 2004-9967 | | 1/2004 |

* cited by examiner

*Primary Examiner*—Paul N. Dickson
*Assistant Examiner*—Robert A. Coker
(74) *Attorney, Agent, or Firm*—Brinks Hofer Gilson & Lione

(57) ABSTRACT

The safety arrangement for a motor vehicle incorporates primary restraint arrangement having a three-point seat-belt (3) and optionally one or more air-bags (19,22). A secondary restraint system is provided in the form of a two-point seat-belt (13). A sensor senses when the two-point seat-belt (13) is in use and provides a signal to a control unit (17) which adjusts the restraining effect provided by the primary restraint arrangement so that the overall restraining effect is the same regardless of whether the two-point seat-belt is, or is not, used. The use of the two-point seat-belt (13) provides enhanced occupant protection especially in a side-impact or rollover situation.

12 Claims, 1 Drawing Sheet

SAFETY ARRANGEMENT

FIELD OF THE INVENTION

The present invention relates to a safety arrangement to provide protection for an occupant of a vehicle in the event that an accident should occur.

BACKGROUND OF THE INVENTION

In many vehicles in use at the present time, the driver and front seat passenger are provided with a three-point seat-belt and, in many cases, are additionally provided with at least one air-bag to restrain the passenger in the event that a front impact should occur. The restraining effect of the three-point seat-belt, or the restraining effect of the combination of the three-point seat-belt and the air-bag, is such that in a typical accident situation the occupant is subjected to an appropriate restraining force, which is not too large and which is not too small, so that the vehicle occupant can be decelerated in an optimum manner.

It has been found, however, that in a far-side side impact situation, that is to say a situation in which there is a side impact on the side of the vehicle which is remote from the occupant, and also in a roll-over situation, there is a risk that the occupant will slip out of the shoulder part of the three-point belt. Of course, if the occupant does slip out of the seat-belt in this way, the seat-belt cannot provide optimal protection.

To avoid this problem arising, and also to provide a better distribution of the load applied to the torso of the occupant by the seat-belt arrangement, it has been proposed to combine a two-point belt with the known three-point belt. The two-point belt is a diagonal belt which forms a "mirror image" of the diagonal part of the three-point seat-belt. Thus the two-point belt extends over the other shoulder, and diagonally across the torso.

At this time, however, the typical combination of a three-point belt and a two-point belt is such that use of the two-point belt is optional, and the occupant may or may not use the two-point belt. If the occupant does use the two-point belt in addition to the three-point belt, the risk of injury in a far-side side impact or roll-over situation is reduced.

However, if a seat occupant uses the two-point belt in addition to the three-point belt, the total restraining force applied to the occupant in an accident situation is increased and consequently the restraining force applied to the seat occupant may be too large, causing the seat occupant to decelerate in an undesirable manner.

The present invention seeks to provide an improved safety arrangement.

SUMMARY OF THE INVENTION

According to this invention there is provided a safety arrangement for an occupant of a vehicle, the safety arrangement incorporating a primary restraint arrangement having at least one restraint component in the form of a three-point seat-belt, and a secondary restraint system comprising a two-point seat-belt. At least one component of the primary restraint arrangement is adjustable to exhibit an adjustable restraining effect, there being a sensor to sense when the two-point seat-belt is in use and a controller responsive to a signal from the sensor to adjust at least a first component of the primary restraint system to reduce the restraining effect provided by the primary restraint system when the two-point seat-belt is in use.

It is thus to be understood that the primary restraint arrangement incorporates a three-point seat-belt, and optionally incorporates at least one further restraint component. In the preferred embodiment, the primary restraint arrangement incorporates, in addition to the three-point seat-belt, two air-bags. However, in other embodiments of the invention, the primary restraint arrangement may include the three-point seat-belt and one or more restraint components of any appropriate form.

It is to be understood that the sensor adjusts at least a first component of the primary restraint system to reduce the restraining effect provided by the primary restraint system when the two-point system seat-belt is in use. The signal from the sensor may adjust the restraining effect provided by the three-point seat-belt. Alternatively, the signal from the sensor may adjust the restraining effect provided by another component of the primary restraint arrangement such as, in the preferred embodiments, one or both of the air-bags that form part of the primary restraint arrangement.

Preferably, the sensor is incorporated in a seat-belt buckle, the buckle being connected to an anchor point and being adapted to receive a tongue mounted on the two-point seat-belt.

Conveniently, the adjustment of the retraining effect provided by the primary restraint arrangement is equivalent to the restraining effect provided by the two-point seat-belt.

Advantageously, three-point seat-belt is provided with an adjustable force limiting arrangement, the adjustable force limiting arrangement being controlled by the controller to provide a reduction of the restraining effect provided by the three-point seat-belt.

Preferably, the primary restraint system incorporates at least one air-bag.

In one embodiment of the invention the at least one air-bag is a front air-bag.

Alternatively, the air-bag is a knee air-bag.

Conveniently, two air-bags are provided, comprising a front air-bag and a knee air-bag.

Advantageously, the air-bag is provided with an adjustable venting arrangement, the adjustable venting arrangement being controlled by the controller to provide a reduction of the restraining effect provided by the air-bag.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
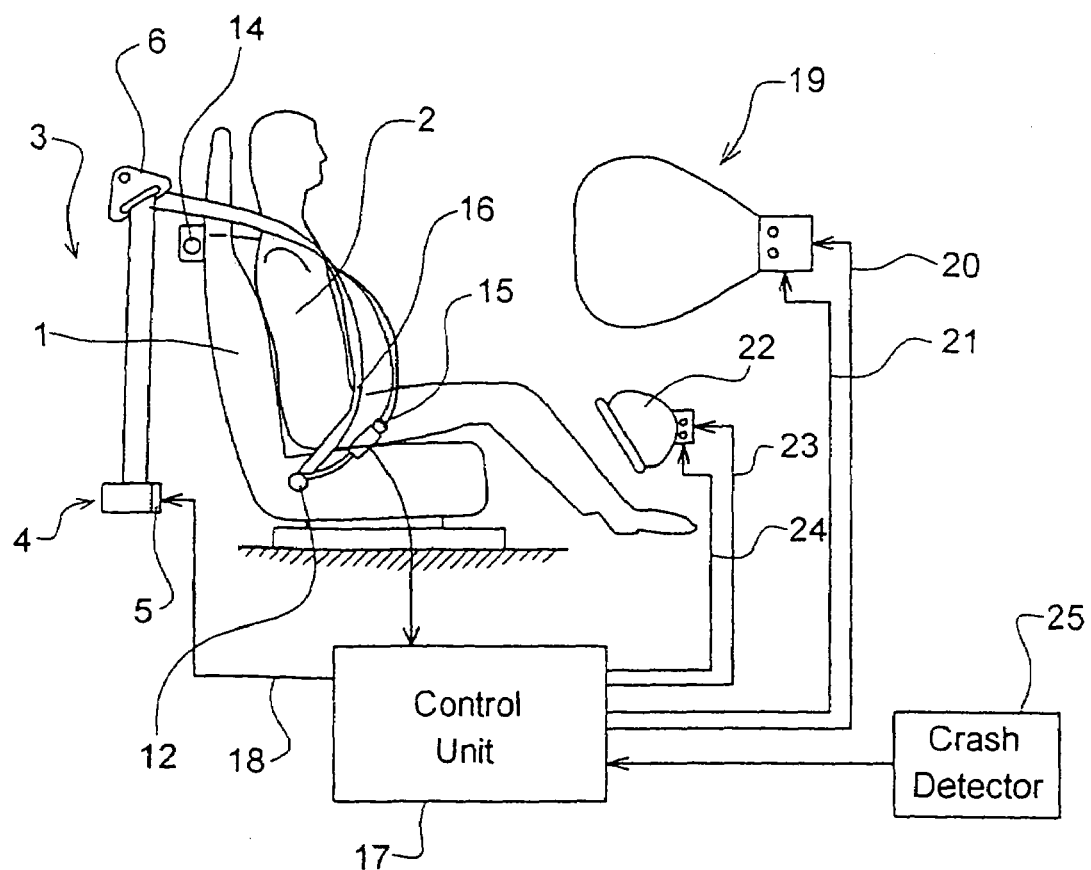
FIG. 1 is a diagrammatic side view of a vehicle seat showing an occupant and illustrating a safety arrangement in accordance with the invention.
Figure 2:
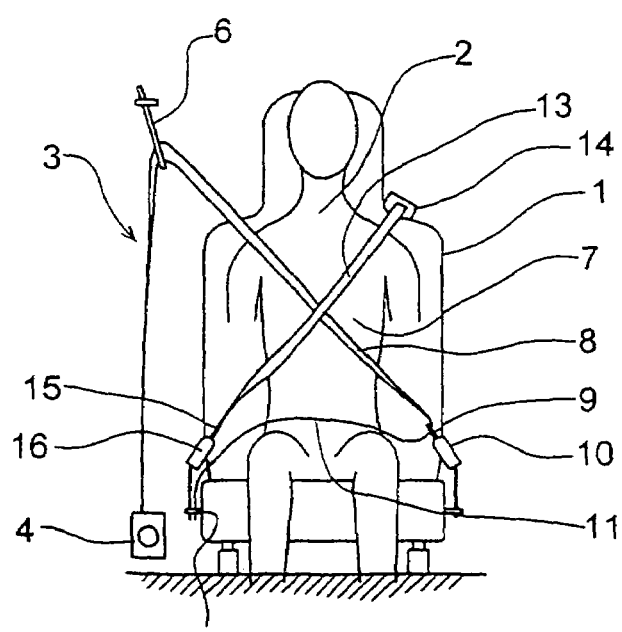
FIG. 2 is a diagrammatic front view of the seat and seat occupant of FIG. 1.

Referring to the drawings a vehicle seat 1 is illustrated which is occupied by a seat occupant 2. The seat is provided with a three-point seat-belt 3. The three-point seat-belt has one end thereof wound on a retractor 4. The retractor 4 is provided with a controllable force limiter 5.

A portion of the three-point belt 3 extends from the retractor 4 to a pillar-loop adjuster 6 which may be mounted on the B-Pillar of the vehicle. A further portion of the belt extends diagonally across the torso 7 of the seat occupant forming a diagonal strap 8. The strap passes through a tongue 9 received in a buckle 10 which is mounted to the seat or to the vehicle on the side thereof remote from the retractor 4. A lap portion of belt 11 passes across the lap of the occupant 2 extending to an anchor point 12 on the side of the seat closest to the retractor 4. The described three-point seat-belt is therefore very similar to a conventional three-point seat-belt.

Mounted on the seat, in addition to the three-point seat-belt 3, is a two-point seat-belt 13. The two-point seat-belt 13 is connected to a retractor 14 which is mounted on the back of the seat 1 substantially at shoulder level for a typical seat occupant.

The end of the two-point belt 13 remote from the retractor 14 is provided with a tongue 15 that is received within a buckle 16 that is connected to the anchor point 12 on the side of the seat adjacent the retractor 4.

The buckle 16 is provided with a sensor to sense whether the tongue 15 is or is not inserted within the buckle, and an output from the sensor is passed to a control unit 17. The control unit 17 is connected, by a lead 18, to the controllable force limiter 5 that forms part of the retractor 4.

The control unit 17 is also additionally connected to a front air-bag 19 by two leads 20, 21. The first lead 20 carries a signal which may trigger the air-bag 19 causing the air-bag to inflate, whereas the lead 21 carries a signal which controls an adjustable vent arrangement provided in the air-bag, so that the venting characteristic of the air-bag may be altered.

The control unit 17 is also connected to a second air-bag 22 in the form of a knee air-bag. The control unit 17 is connected to the knee air-bag 22 by two leads 23, 24. The lead 23 carries a signal which can trigger the knee air-bag 22 to cause the knee air-bag to inflate, whereas the lead 24 carries a signal which can control an adjustable vent arrangement provided in the knee air-bag so that the air-bag has a desired selected venting characteristic.

The three-point seat-belt 3 and the air-bag 19 form a primary restraint arrangement and the two-point seat-belt 13 is a secondary restraint. A crash detector 25, which may be any known form of crash detector, such as an accelerometer, is also connected to the control unit 17.

The control unit 17 is adapted to control the operating characteristics of the three-point seat-belt 3 and the air-bags 19 and 22 in dependence upon whether the two-point belt 13 is in use or is not in use.

If the seat occupant only utilises the three-point seat-belt 3, the seat occupant will, in an accident situation, be restrained solely by the three-point seat-belt and the two air-bags 19 and 22. In such a situation, the air-bags 19 and 22 will have to absorb a substantial portion of the momentum of the seat occupant 2 and thus, whilst the air-bag may be vented, they should only be vented to a relatively small extent. Also the force limiter 5 associated with the retractor 4 should be set so that the force limit level is relatively high, enabling the three-point seat-belt to absorb a substantial amount of energy. The control unit 17 will cause the air-bags 19 and 22 and the retractor 4 to operate in this general manner if the tongue 15 is not inserted into the buckle 16.

However, if the buckle 16 of the two-point seat-belt 13 is inserted into the buckle 16, the two-point seat-belt is being used in addition to the three-point seat-belt and both seat-belts acting together, will apply a greater restraining force to the seat occupant 2 than the three-point seat-belt alone. Thus, when the sensor within the buckle 16 senses the presence of the tongue 15, the control unit 17 modifies the mode of operation of the retractor 4, by adjusting the force level of the force limiter 5, and/or also adjusts the deployment of one or both of the air-bags 19 and 22, by increasing the venting of the air-bags, to adjust the restraining effect provided by the primary restraint arrangement formed by the three-point belt 3 together with the air-bags. Preferably the force limiter 5 is controlled and the adjustable venting of both of the air-bags 19 and 22 is controlled, to provide appropriate deceleration of the seat occupant 2. Thus, in the described embodiment, the seat occupant 2 is still given the desired retarding force in a frontal impact when the two-point belt 13 is used in addition to the three-point belt 3. It is to be understood that preferably the adjustment of the restraining effect provided by the primary restraint arrangement is equivalent to the additional restraining effect provided by the two-point seat-belt 13 acting as the secondary restraint arrangement. Thus the overall restraining effect on the seat occupant 2 is the same, regardless of whether the two-point seat-belt 13 is or is not used. Of course, if the two-point seat-belt 13 is used, the risk of injury occurring during a far-side impact or a rollover is reduced.

It is to be noted that the invention has been described with reference to an embodiment in which air-bags are provided, but of course the invention could be used in an embodiment in which there is simply a two-point belt 13 and a three-point belt 3, the restraining effect of the three-point seat-belt alone being adjusted in dependence upon whether the two-point seat-belt is or is not in use.

In the illustrated embodiment of the invention, the three-point seat-belt 3 and the two-point seat-belt extend over the two opposed upper corners of the back rest of the seat 1 so as to cross in a "X" configuration extending across the torso 7 of the seat occupant 2. In a modified embodiment of the invention, the three-point seat-belt 3 passes over the shoulder of the seat 1 provided at one side of the seat with the diagonal portion 8 of the belt extending to the tongue 9 and buckle 10 on the other side of the seat. The two-point belt 13 may pass through a guide provided on the other side of the seat 1, with the free end of the two-point belt 13 extending to an anchorage 12 also provided on the other side of the seat. The combination of the three-point 3 and the two-point 13 belt will therefore form a "V" extending across the upper torso 7 of the seat occupant 2.

The features disclosed in the foregoing description, or the following Claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A safety arrangement for an occupant of a vehicle, the safety arrangement comprising a primary restraint arrangement having at least one restraint component including a three-point seat-belt, and a secondary restraint arrangement including a two-point seat-belt, the primary restraint arrangement being adjustable to exhibit an adjustable restraining effect, a sensor to sense when the two-point seat-belt is in use by the occupant, and a controller responsive to a signal from the sensor to adjust the primary restraint arrangement to reduce the restraining effect provided by the primary restraint arrangement when the two-point seat-belt is in use by the occupant.

2. An arrangement according to claim 1 wherein the sensor is incorporated in a buckle, the buckle being connected to an anchor point and being adapted to receive a tongue mounted on the two-point seat-belt.

3. An arrangement according to claim 1 wherein the level of the reduced restaining effect provided by the primary restraint arrangement is equivalent to the level of the restraining effect provided by the two-point seat-belt.

4. An arrangement according to claim 1 wherein the three-point seat-belt is provided with an adjustable force limiting retractor, the adjustable force limiting retractor being controlled by the controller to provide the reduction of the restraining effect provided by the primary restraint arrangement.

5. An arrangement according to claim 1 wherein the primary restraint arrangement further incorporates at least a first air-bag.

6. An arrangement according to claim 5 wherein the first air-bag is a front air-bag.

7. An arrangement according to claim 5 wherein the first air-bag is a knee air-bag.

8. An arrangement according to claim 5 wherein the first air-bag is a front air-bag and a second air-bag is provided in the form of a knee air-bag.

9. An arrangement according to claim 5 wherein the first air-bag is provided with an adjustable venting arrangement, the adjustable venting arrangement being controlled by the controller to provide a reduction of the restraining effect provided by the first air-bag.

10. An arrangement according to claim 6 wherein the first air-bag is provided with an adjustable venting arrangement, the adjustable venting arrangement being controlled by the controller to provide a reduction of the restraining effect provided by the first air-bag.

11. An arrangement according to claim 7 wherein the first air-bag is provided with an adjustable venting arrangement, the adjustable venting arrangement being controlled by the controller to provide a reduction of the restraining effect provided by the first air-bag.

12. An arrangement according to claim 1 wherein the three-point seat-belt includes a shoulder belt portion extendable across the torso of the occupant over one shoulder, and the two-point seat-belt extendable across the torso of the occupant over an opposite shoulder, whereby the three-point seat-belt and the two-point seat-belt can criss-cross over the torso of the occupant.

* * * * *